United States Patent [19]

Liao et al.

[11] Patent Number: 5,234,604
[45] Date of Patent: Aug. 10, 1993

[54] WATER SOLUBLE BLOCK COPOLYMERS AND METHODS OF USE THEROF

[75] Inventors: Wen P. Liao, Warminster; Fu Chen, Newtown; Stephen R. Vasconcellos, Doylestown, all of Pa.

[73] Assignee: Betz Laboratories, Inc., Trevose, Pa.

[21] Appl. No.: 939,810

[22] Filed: Sep. 3, 1992

Related U.S. Application Data

[62] Division of Ser. No. 661,580, Feb. 26, 1991, Pat. No. 5,182,331.

[51] Int. Cl.$^5$ .................. C02F 1/56; C08F 293/00
[52] U.S. Cl. .................. 210/734; 525/273; 525/263; 525/294; 525/299; 525/308
[58] Field of Search .................. 210/734; 525/294, 299, 525/308

[56] References Cited

U.S. PATENT DOCUMENTS

| | | |
|---|---|---|
| 3,984,333 | 10/1976 | van de Kraats et al. ...... 252/8.55 D |
| 4,492,785 | 1/1985 | Valint, Jr. et al. .................. 524/529 |
| 4,521,580 | 4/1985 | Turner et al. .................. 526/307.2 |
| 4,528,348 | 7/1985 | Turner et al. .................. 526/225 |
| 4,540,498 | 9/1985 | Wu et al. .................. 525/294 |
| 4,755,563 | 7/1988 | West .................. 525/294 |
| 4,835,234 | 5/1989 | Valint et al. .................. 526/258 |
| 4,906,716 | 3/1990 | Yang et al. .................. 526/307.2 |
| 5,035,806 | 7/1991 | Fong et al. .................. 210/701 |

Primary Examiner—James J. Seidleck
Assistant Examiner—Vasu S. Jagannathan
Attorney, Agent, or Firm—Alexander D. Ricci; Gregory M. Hill

[57] ABSTRACT

A composition and method of use thereof for the treatment of wastewater comprising a block copolymer having the formula:

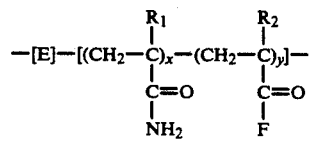

wherein E is a polymeric segment obtained from the polymerization of hydrophobic monomers, x when present is a nonionic monomer, y is a cationic monomer, $R_1$ and $R_2$ are the same or different and are H or a lower alkyl group from $C_1$ to $C_3$ and F is a salt of an ammonium cation.

10 Claims, No Drawings

WATER SOLUBLE BLOCK COPOLYMERS AND METHODS OF USE THEROF

This is a divisional of application Ser. No. 07/661,580 filed Feb. 26, 1991, now U.S. Pat. No. 5,182,331.

FIELD OF THE INVENTION

The present invention relates to water soluble block copolymers containing water soluble and water insoluble monomers which are useful for water treatment, especially sludge dewatering and water clarification.

BACKGROUND OF THE INVENTION

There is an increasing usage of water soluble polymers and copolymers in wastewater treatment industries. These compounds have shown desirable utility for the purpose of dewatering sludge and clarifying contaminated water.

The efficacies of the polymers or copolymers used will vary depending upon the type of monomers chosen to form the polymer or copolymer, the molecular weight of the synthesized molecule and, in the case of a copolymer, the placement of the selected monomers on the backbone of the copolymer. It is the latter characteristic that is the focus of the present invention.

Copolymers may be synthesized without attention to the distribution of the two base monomers along its backbone resulting in a random distribution of these monomers. Synthesis may be controlled, however, to form a copolymer having long sequences of monomers, e.g. A and B, as follows:

—AAAA—BBBB—AAAAA—BBBBB—

This formation results in compounds referred to as block copolymers.

Block copolymers exhibit unique properties and as a result are more desirable than random copolymers or a blend of the two homopolymers synthesized from the respective monomers. The industrial importance of block copolymers has increased markedly in recent years for these reasons.

RELATED ART

U.S. Pat. No. 4,492,785 describes water soluble block polymers of t-butylstyrene/styrene sulfonate and t-butylstyrene/styrene sulfonate/t-butylstyrene. The preparation process requires sequential anionic polymerization, sulfonation, separation and purification. The product is used as a viscosification agent.

U.S. Pat. Nos. 4,521,580 and 4,528,348 disclose a method of using surfactants to solubilize water insoluble monomers such as octyl acrylamide in order to copolymerize with acrylamide.

U.S. Pat. No. 4,906,716 discloses a process of incorporating hydrophobic water insoluble monomers, such as alkyl acrylamides which are solid at room temperature, with acrylamide into a water soluble copolymer. The process involves heating the hydrophobic water insoluble monomer to above their melting point.

U.S. Pat. No. 4,835,234 discloses hydrophobically associating terpolymers containing acrylamide, cationic monomer and water insoluble monomers such as higher alkylacrylate or alkylamide. All monomers are mixed together in solution prior to a micellar polymerization. The resulting polymers are random copolymers in nature.

U.S. Pat. No. 3,984,333 teaches using a water-soluble block copolymer having water-soluble blocks and water-insoluble blocks for an oil recovery process. While such water-soluble block copolymers exhibit reasonably good resistance to shear degradation, such polymers are difficult and often impractical to prepare. While polymers containing hydrophobic or water insoluble groups are disclosed, none have the same configuration as disclosed in this invention. The hydrophobic or water insoluble groups in the polymer of this invention are not randomly distributed as in the related art, but form a polymeric segment attached to a polymer chain obtained from copolymerization of acrylamide and cationic monomers. The resulting polymer has a block copolymer structure and shows unique solution properties. As the polymer is placed in an aqueous solution, the hydrophobic segments aggregate or associate in a manner similar to a surfactant. The association between polymer chains results in an increase in the hydrodynamic size, which in turn, causes an increase in solution viscosity. As a result, the block copolymers in this invention are quite effective in sludge dewatering applications as compared to the commercial or related art materials with much higher intrinsic viscosities. The new class of water soluble block copolymers can be used at a lower dosage and also shows a wider optimum dosage range than conventional materials. This will lower the treatment cost and reduces the risk of overdose for sludge dewatering, a highly undesirable consequence.

DETAILED DESCRIPTION OF THE INVENTION

The block copolymers of the invention useful for water treatment contain a polymeric segment obtained from polymerization of hydrophobic or water insoluble monomers attached to a polymer chain obtained from polymerization of one or more water soluble monomers. The resulting block copolymers are water soluble.

The block copolymer of the invention has the general structure:

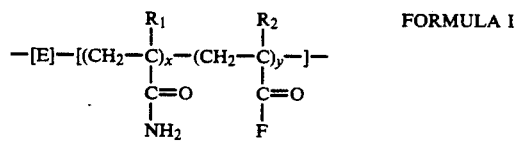

FORMULA I wherein E is a polymeric segment obtained from the polymerization of hydrophobic or water insoluble monomers. Examples of such monomers include alkyl acrylamides, alkyl methacrylamides, alkyl acrylates, alkyl methacrylates, and alkylstyrenes. Preferably, the hydrophobic monomer is an alkyl acrylate having 4 to about 16 carbon atoms in the alkyl group such as 2-ethylhexyl acrylate. Other suitable hydrophobic or water insoluble monomers include the higher alkyl esters of ethylenically unsaturated carboxylic acids such as alkyl dodecyl acrylate, dodecyl methacrylate, tridecyl acrylate, tridecyl methacrylate, octadecyl acrylate, octadecyl methacrylate, ethyl half ester of maleic anhydride, diethyl maleate, and other alkyl esters derived from the reactions of alkanols having from 8 to 20 carbon atoms with ethylenically unsaturated carboxylic acids such as acrylic acid, methacrylic acid, maleic anhydride, fumaric acid, itaconic acid and aconitic acid, alkylaryl esters of ethylenically unsaturated carboxylic acids such as nonyl-α-phenyl acrylate, nonyl-α-phenyl methacrylate, dodecyl-α-phenyl acrylate and dodecyl-α-phenyl methacrylate; N-alkyl, ethylenically unsaturated amides such as N-octadecyl acrylamide, N-octadecyl methacrylamide, N,N-dioctyl acrylamide and similar derivatives thereof; vinyl alkylates wherein alkyl has at least 8 carbons such as vinyl laurate and vinyl stearate, vinyl alkyl ethers such as dodecyl vinyl ether and hexadecyl vinyl ether; N-vinyl amides such as N-vinyl lauramide and N-vinyl stearamide; and aralkylstyrenes such as t-butyl styrene. Of the foregoing hydrophobic monomers, the alkyl esters of acrylic acid and methacrylic acid wherein alkyl has from 4 to 16 carbon atoms, are preferred. The hydrophobic polymers are not water soluble and can be prepared by precipitation or emulsion polymerization techniques.

Monomer x, when present, in the Formula I is a nonionic monomer such as acrylamide or alkylacrylamide. $R_1$ and $R_2$ is H or a lower alkyl group having $C_1$ to $C_3$. Monomer y is a cationic monomer. F in the above formula is a salt of an ammonium cation, such as $NHR_3N^+$ $(R_{4,5,6})M^-$ or $OR_3N^+$ $(R_{4,5,6})M^-$, wherein $R_3$ is a $C_1$ to $C_4$ linear or branched alkylene group, and $R_4$, $R_5$ and $R_6$ can be selected from the group consisting of hydrogen, $C_1$ to $C_4$ linear or branched alkyl, $C_5$ to $C_8$ cycloalkyl, aromatic or alkylaromatic group; and $M^-$ is an anion, such as chloride, bromide, or methyl or hydrogen sulfate. Typical cationic monomers are 2-acryloxyethyltrimethyl ammonium chloride (AETAC), 3-methacrylamidopropyltrimethyl ammonium chloride (MAPTAC), 2-methacryloxyethyltrimethyl ammonium chloride (METAC) and diallyl dimethyl ammonium chloride (DADMAC), etc.

The molar percentage x:y of nonionic monomer:cationic monomer, may fall within the range of between 0:100 to 95:5. The molar percentages of x and y must add up to 100%. It is to be understood that more than one kind of cationic monomer may be present in the Formula I.

At present, the preferred water soluble block copolymer for sludge dewatering applications is:

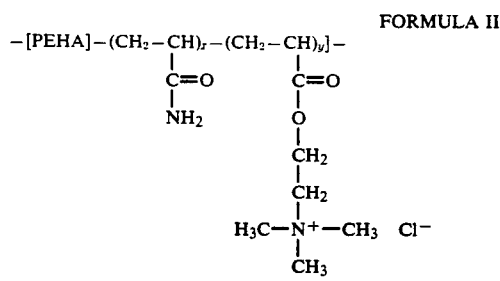

FORMULA II wherein PEHA is poly(2-ethylhexyl acrylate) obtained from polymerization of 2-ethylhexyl acrylate (EHA) initiated by a diperoxide initiator, 2,5-dihydroperoxy-2,5-dimethylhexane (Luperox 2,5-2,5, Pennwalt). The resulting poly(EHA) is water insoluble and has a hydrophobic nature. The number average molecular weight (Mn) of poly(EHA) may fall within the range of 500 to 1,000,000.

Preferably, the number average molecular weight will be within the range of 1,000 to 500,000, with the range of about 5,000 to about 200,000 being even more desirable. The key criterion is that the resulting block copolymer be water soluble. Since the diperoxide initiator is used to initiate EHA, the resulting poly(EHA) still contains peroxide for further reaction. It is then copolymerized with monomers x and y to form a block copolymer.

In this invention, the preferred monomer x is acrylamide and monomer y is 2-acryloxyethyltrimethyl ammonium chloride (AETAC). The molar percentage of x:y is from about 0:100 to 95:5, with the molar percentage of from about 10:90 to 75:25 being preferred. The block copolymers are prepared by a water-in-oil emulsion technique. Such processes have been disclosed in U.S. Pat. Nos. 3,284,393, Re. 28,474 and Re. 28,576, herein incorporated by reference. The resulting copolymers may also be further isolated by precipitating it in an organic solvent such as acetone and dried to a powder form. The powder can be easily dissolved in an aqueous medium for use in desired applications.

Branching agents such as polyethyleneglycol di(meth) acrylate, methylene bis(meth)acrylamide, N-vinyl acrylamide, allyl glycidyl ether, glycidyl acrylate and the like may also be added, providing the resulting block copolymer is water soluble. It is to be understood that the aforementioned polymerization methods do not in any way limit the synthesis of polymers according to this invention. Any of the well known chain transfer agents familiar to those who skilled in the art may be used to control the molecular weight. Those include, but are not limited to, lower alkyl alcohols such as isopropanol, amines, mercaptans, phosphites, thioacids, allyl alcohol and the like.

The structure of the block copolymer is substantiated by a conventional solution viscosity study and $C^{13}$ NMR spectroscopy. The molecular weight of the resulting block copolymer is not critical, as long as it is soluble in water.

EXPERIMENTAL SYNTHESIS OF BLOCK COPOLYMERS

Example 1

Peroxide-Containing Poly(2-ethylhexyl acrylate)

A suitable reaction flask was equipped with a condenser, a thermometer, a nitrogen inlet, and an overhead mechanical agitator. The flask was charged with 150 g of 2-ethylhexyl acrylate (EHA, Aldrich), 8 g of 70% 2,5-dihydroperoxy-2,5-dimethylhexane (Luperox 2,5-2,5, Lucidol) and 300 g of methanol. The resulting hazy solution was gradually heated to 50° C. under nitrogen. A sodium metabisulfite solution (SMB, 1 g in 10 g water) was prepared separately and sparged with nitrogen.

The bisulfite solution was then added slowly to the reaction flask. Almost immediately the slightly hazy solution turned into a white colloidal dispersion and the polymer precipitate gradually formed. After the addition of bisulfite solution was complete, the reaction temperature was raised to 60° C. for about 40 minutes. The solvent was then distilled off under reduced pressure at an elevated temperature to give brownish polymer paste. No residual monomer was detected by $C^{13}$ NMR. The resulting polymer was then redissolved in a low volatile oil (Soltrol 145, Philips Petroleum). The Brookfield viscosity was 780 cps (49.7% polymer) and the molecular weights determined by gel permeation chromatography was $Mn = 9.5 \times 10^3$, $Mw = 7.4 \times 10^4$ g/mole.

Examples 2-5

Block Copolymers

Block copolymers of acrylamide (AM), 2-acryloyloxyethyltrimethyl ammonium chloride (AETAC) and peroxide-containing poly(EHA) of Example 1 were prepared using a water-in-oil emulsion polymerization technique. The typical polymerization procedure is shown as follows.

A reaction flask similar to that described in Example 1 was charged with an oil phase which contained sorbitan monooleate, oil and peroxide containing poly(EHA) of Example 1. The exact charges are shown in Table I.

An aqueous phase was prepared separately which contained acrylamide (AM), 2-acryloyloxyethyltrimethyl ammonium chloride (AETAC), water, and a chelating agent (Table I). The solution was further adjusted with acid to pH 4.5.

The aqueous phase was added to the oil phase and the resulting emulsion was further homogenized with a homogenizer to obtain a stable water-in-oil emulsion. The emulsion was purged with nitrogen for 30 minutes.

The polymerization was initiated by slowly adding a dilute sodium metabisulfite solution (SMB) to the emulsion under nitrogen and the temperature was maintained at 50°-85° C. by an external cooling. After the addition, the emulsion was held at 50°-85° C. for 30 minutes. A trace amount of t-butylhydroperoxide (t-BHP) was then added to the emulsion. The emulsion was held at 50° C. for an additional 30 minutes before cooled. A blend of surfactants was finally added to the emulsion.

$C^{13}$ NMR showed that there was no detectable amount of residual monomer in the resulting emulsion. The emulsion readily inverted into an aqueous solution when added to water.

TABLE 1

Preparation of Block Copolymers

| Reagents Charged (grams) | Example 2 | Example 3 | Example 4 | Example 5 |
| --- | --- | --- | --- | --- |
| Sorbitan monooleate | 10.47 | 10.47 | 12.82 | 10.16 |
| Example 1, Poly (EHA) | 37.78 | 37.78 | 37.83 | 20.00 |
| Soltrol 145 | 115.93 | 115.78 | 145.91 | 120.63 |
| 50% AM | 141.02 | 114.80 | 89.20 | — |
| 79.2% AETAC | 89.31 | 134.45 | 178.65 | 175.60 |
| D.I. Water | 52.34 | 56.31 | 104.31 | 102.65 |
| Versenex 80 | 0.64 | 0.62 | 0.53 | 0.54 |
| SMB | 5.00 | 5.00 | 5.00 | 2.65 |
| D.I. Water | 10.50 | 10.03 | 10.00 | 10.90 |
| t-BHP(70%) | 1.72 | 1.70 | 1.70 | 0.90 |
| D.I. Water | 10.33 | 10.26 | 10.00 | 10.09 |
| Tergitol 15-S-9 | 16.70 | 17.50 | 21.07 | 15.99 |
| Aerosol GPG | 4.18 | 4.38 | 5.27 | 4.00 |

Soltrol 145 = hydrocarbon oil, Phillips Petroleum
AM = acrylamide
AETAC = 2-acryloyloxyethyltrimethyl ammonium chloride
Versenex 80 = pentasodium diethylenetriamine pentraacetic acid solution, Dow
SMB = sodium metabisulfite
Tergitol 15-S-9 = C11-C15 secondary alcohol ethoxylate, Union Carbide
Aerosol GPG = dioctyl ester of sodium sulfosuccinic acid, American Cyanamid

Example 6

Peroxide-Containing Poly(EHA)

A similar polymerization process as in Example 1 was utilized. The formulation was as follows:

| | |
| --- | --- |
| 2-ethylhexyl acrylate | 60.0 g |
| Luperox 2,5-2,5 | 0.7 |

-continued

| | |
| --- | --- |
| Methanol | 300.0 |
| Sodium metabisulfite | 0.6 |
| D.I. Water | 5.0 |

After polymerization was complete, a large excess of water was added to the mixture. The resulting water insoluble poly(EHA) was removed from the mixture and dried in a vacuum oven. The poly(EHA) obtained was redissolved in a low volatile oil (LOPS, Exxon) at a polymer concentration of 16.8% (w/w) and was to be used for Example 7.

Example 7

Block Copolymer

Utilizing the similar procedure described in Examples 2-5, except that sulfur dioxide ($SO_2$) instead of SMB was used to activate the peroxide groups in the poly(EHA) of Example 6. In addition, Luperox 2,5-2,5 (Lucidol) instead of t-BHP was used to couple with $SO_2$ to react with residual monomer. $SO_2$ was added at once, the exotherm of the polymerization quickly raised the reaction temperature to 85° C.

Air was used occasionally to help control the reaction. The resulting polymer was precipitated in acetone and filtered. It was further dried in a vacuum oven to obtain a dry powder. The formulation was as follows:

| | |
| --- | --- |
| Sorbitan monooleate | 8.95 g |
| Atlas G-1086* | 10.35 |
| Example 6, Poly(EHA) | 127.34 |
| 50% AM | 137.02 |
| 79.2% AETAC | 155.56 |
| D.I. Water | 89.27 |
| Versenex 80 | 0.67 |
| Luperox 2,25-2,5 | 0.047 |
| D.I. Water | 5.08 |

*Atlas G-1086 = polyoxyethylene sorbitol hexa-oleate, ICI

The intrinsic viscosities of the resulting block copolymers are shown in Table II.

TABLE II

Block Copolymers

| Polymer | Intrinsic Viscosity(dl/g) | % Solids |
| --- | --- | --- |
| Example 2 | 4.3 | 40.6 |
| Example 3 | 5.4 | 42.9 |
| Example 4 | 3.9 | 39.6 |
| Example 5 | 3.8 | 37.4 |
| Example 7 | 4.5 | — |

PERFORMANCE TESTS

In the following tests, the performance of the resulting water soluble block copolymers described in this invention is demonstrated. The Capillary Suction Time (CST) device was used to measure the dewatering performance of the various polymers on several different substrates. The CST device consists of an electronic timer, a plexiglass cell holder containing two concentric electrodes, and a tall stainless steel cylindrical cell. The device operates by measuring the drainage of water from a sludge substrate out of the cell. This is accomplished by placing the cell holder containing the two electrodes on a piece of Whatman #17 chromatography paper, 7.0×9.0 cm in size. The tall cylinder is then placed in the hole in the cell holder. The cell holder is connected to the electronic timer, which is turned on and reset. A 7 ml aliquot of the substrate is introduced into the cell. As the water migrates out of the cell, it is absorbed onto the chromatography paper. This results in a migration of a water front through the paper. As the water advances, it contacts the first electrode, activating the timer. Continued advancement of the water eventually reaches the second electrode, completing the circuit and shutting off the timer. The process is repeated for several polymer dosages. A dosage response curve plotting CST time (in seconds) versus polymer dosage gives an indication of a particular polymer's effectiveness in dewatering a substrate. The dosage curve minimum is an indication of the optimum polymer dosage, while the extent of the trough gives a measure of the polymer's tendency to overdose. Overdosing is observed when the CST values increase with increasing polymer dosage.

The following experimental protocol was followed for the tests conducted:

1. A sample of known volume of sludge (usually 250 ml) was placed in a beaker.
2. A known amount of polymer from a 0.5% stock solution was added to the beaker to give a pre-determined concentration. The 0.5% polymer stock solution was prepared by adding a known amount of the active polymer to a fixed volume of water, and then mixing for 15 minutes at 600 rpm using a standard 3 blade mixer.
3. The treated substrate was mixed for 30 seconds at constant RPM using a standard 3 blade mixer.
4. A 7 ml aliquot was withdrawn from the beaker and placed in the CST cylindrical cell.
5. The time required for the water to complete the electrode circuit of the CST device was recorded.
6. The process was repeated until a reasonable dosage response was generated.

Test 1

A sample of mixed primary and secondary sludge from a paper mill was used as a substrate. For this test, block copolymers of varying cationic monomer content was evaluated (Table II). Their performance was compared to commercial polymers commonly used for dewatering at similar percent solids and cationic monomer content. The commercial polymers tested are given in Table III.

TABLE III

| Polymer | Commerical Polymers Tested | |
|---|---|---|
| | Intrinsic Viscosity(dl/g) | % Solids |
| Polymer A | 8.4 | 42.0 |
| Polymer B | 9.7 | 42.0 |
| Polymer C | 3.9 | 39.6 |
| Polymer D | 9.7 | 45.0 |

Polymers A, B, C and D are acrylamide/AETAC copolymers commercially available from American Cyanamid and vary in molar percentages and molecular weights.

The dewatering performance of the various polymers is shown in Table IV.

TABLE IV

| Polymer | Dewatering Performance | | | |
|---|---|---|---|---|
| | CST(sec) at varying polymer dosages(ppm) | | | |
| | 100 | 200 | 300 | 400 |
| Example 3 | 110 | 80 | 20 | 10 |
| Polymer A | 190 | 120 | 50 | 20 |
| Example 2 | 120 | 100 | 40 | 20 |
| Polymer B | 100 | 70 | 20 | 10 |

TABLE IV-continued

| Polymer | Dewatering Performance | | | |
|---|---|---|---|---|
| | CST(sec) at varying polymer dosages(ppm) | | | |
| | 100 | 200 | 300 | 400 |
| Example 5 | 120 | 30 | 10 | 10 |
| Polymer C | 260 | 250 | 140 | 200 |
| Example 4 | 90 | 20 | 10 | 10 |
| Polymer D | 160 | 110 | 30 | 10 |

Blank: 350 sec.

Test 2

In this test, secondary sludge from a petroleum facility was used as the test substrate. The polymers evaluated are shown in Tables II and III. Results of the dewatering evaluation are given in Table V.

TABLE V

| Polymer | Dewatering Performance | | | | |
|---|---|---|---|---|---|
| | CST(sec) at varying polymer dosages(ppm) | | | | |
| | 200 | 250 | 300 | 400 | 500 |
| Example 2 | 30 | 25 | 18 | 10 | 5 |
| Polymer B | 20 | 15 | 10 | 5 | 5 |
| Example 3 | 30 | 15 | 10 | 5 | 5 |
| Polymer A | 35 | 12 | 10 | 5 | 5 |
| Example 4 | 35 | 10 | 5 | 5 | 12 |
| Polymer D | 38 | 25 | 15 | 5 | 5 |
| Example 5 | 45 | 25 | 15 | 7 | 20 |
| Polymer C | 100 | 75 | 15 | 8 | 10 |

Test 3

A sample of mixed primary and secondary sludge from a paper mill was used as the test substrate. The block copolymer performance was compared to a commercial copolymer containing similar mole % of the cationic monomer used for this type of application.

Dewatering performance is presented in Table VI.

TABLE VI

| Polymer | Dewatering Performance | | | | |
|---|---|---|---|---|---|
| | CST(sec) at varying polymer dosages(ppm) | | | | |
| | 25 | 50 | 100 | 150 | 200 |
| Polymer A | 35 | 18 | 9 | 15 | 30 |
| Example 7 | 33 | 12 | 7 | 7 | 7 |

The above data show that the block copolymers in this invention are effective for sludge dewatering. They also offer the unexpected advantage of being more tolerant to overdosing, in that over the range presented, the CST values do not increase with increasing polymer dosage, as is the case with commercial polymers.

We claim:

1. A method of treating wastewater comprising adding to said wastewater an effective amount of a block copolymer having the formula:

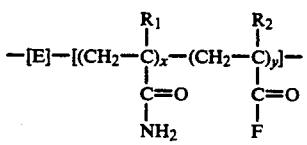

wherein E is a polymer obtained from the polymerization of ethylenically unsaturated hydrophobic monomers initiated by a difunctional initiator; $R_1$ and $R_2$ are H or a $C_1$ to $C_3$ alkyl group; F is a salt of an ammonium cation selected from the group consisting of $NHR_3N^+(R_{4,5,6})M^-$ and $OR_3N^+(R_{4,5,6})M^-$; wherein $R_3$ is a $C_1$ to $C_4$ linear or branched alkylene group; $R_4$, $R_5$ and $R_6$ are H, $C_1$ to $C_4$ linear or branched alkyl, $C_5$ to $C_8$ cycloalkyl, aromatic or alkylaromatic; $M^-$ is an anion selected from the group consisting of chloride, bromide, methyl sulfate and hydrogen sulfate; and the molar percentage of x:y is from about 0:100 to 95:5, with the proviso that the total of x+y equals 100%.

2. The method of claim 1 wherein the ethylenically unsaturated hydrophobic monomer is selected from the group consisting of alkyl acrylate having from 4 to about 16 carbon atoms, the higher alkyl esters of ethylenically unsaturated carboxylic acids, alkaryl esters of ethylenically unsaturated carboxylic acids, N-alkyl ethylenically unsaturated amides, vinyl alkylates wherein the alkyl moiety has at least 8 carbon atoms, N-vinyl amides and aralkylstyrenes.

3. The method of claim 2 wherein the ethylenically unsaturated carboxylic acids of the higher alkyl esters are selected from the group consisting of acrylic acid and methacrylic acid.

4. The method of claim 2 wherein the alkyl acrylate is 2-ethylhexyl acrylate.

5. The method of claim 1 wherein the nonionic monomer is selected from the group consisting of acrylamide and alkylacrylamide.

6. The method of claim 5 wherein the nonionic monomer is acrylamide.

7. The method of claim 1 wherein the cationic monomer is selected from the group consisting of 2-acryloxyethyltrimethyl ammonium chloride, 3-methacrylamidopropyltrimethyl ammonium chloride, 2-methacryloxyethyltrimethyl ammonium chloride and diallyl dimethyl ammonium chloride.

8. The method of claim 1 having the formula:

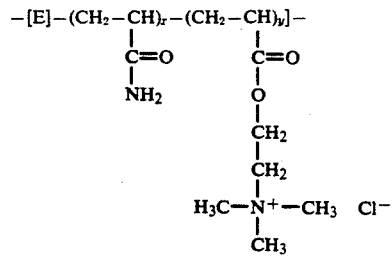

wherein E is a polymer of 2-ethylhexyl acrylate.

9. The method of claim 1 further comprising dewatering sludge.

10. The method of claim 1 further comprising clarifying water.

* * * * *